United States Patent
Nieforth et al.

(10) Patent No.: US 11,923,746 B2
(45) Date of Patent: Mar. 5, 2024

(54) MAGNETIC BEARING COOLING MANAGEMENT

(71) Applicant: Carrier Corporation, Palm Beach Gardens, NY (US)

(72) Inventors: Scott A. Nieforth, Clay, NY (US); Vishnu Sishtla, Manilus, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 248 days.

(21) Appl. No.: 17/248,031

(22) Filed: Jan. 6, 2021

(65) Prior Publication Data
US 2021/0242744 A1 Aug. 5, 2021

Related U.S. Application Data

(60) Provisional application No. 62/967,620, filed on Jan. 30, 2020.

(51) Int. Cl.
| | |
|---|---|
| *H02K 5/08* | (2006.01) |
| *F04C 2/02* | (2006.01) |
| *F04C 18/02* | (2006.01) |
| *F04D 25/06* | (2006.01) |
| *F04D 29/58* | (2006.01) |

(Continued)

(52) U.S. Cl.
CPC .................. *H02K 5/08* (2013.01); *F04C 2/02* (2013.01); *F04C 18/02* (2013.01); *F04D 25/06* (2013.01); *F04D 29/5806* (2013.01); *H02K 5/1735* (2013.01); *H02K 9/19* (2013.01)

(58) Field of Classification Search
CPC .......... H02K 5/08; H02K 5/1735; H02K 9/19; F04C 2/02; F04C 18/02; F04C 18/0207; F04C 2210/26; F04C 2240/56; F04C 29/045; F04C 29/04; F04D 25/06; F04D 25/0606; F04D 29/5806; F04D 29/051; F04D 29/5853; F04D 29/058; F04D 29/584

See application file for complete search history.

(56) References Cited

U.S. PATENT DOCUMENTS

| 5,980,218 A | 11/1999 | Takahashi et al. |
| 2005/0093382 A1 | 5/2005 | Kuhn |

(Continued)

FOREIGN PATENT DOCUMENTS

| CN | 205025807 | 2/2016 |
| EP | 1467104 | 10/2004 |
| WO | WO-2018162085 A1 * | 9/2018 |

OTHER PUBLICATIONS

European Patent Office Search Report.

*Primary Examiner* — Emmanuel E Duke
(74) *Attorney, Agent, or Firm* — Patricia S. Whitehouse

(57) ABSTRACT

A shield for controlling the cooling within a hermetically cooled motor, and a compressor incorporating the shield are provided. The shield includes an insulator, at least one fastener, and a venting aperture. The insulator restricts the flow of a working fluid between a first side and a second side. The at least one fastener secures the insulator. The venting aperture controls a pressure differential between the first side and the second side. The venting aperture may include at least one hole through the insulator. The venting aperture may be provided as a hole through the insulator for the rotating shaft of the compressor.

18 Claims, 4 Drawing Sheets

(51) Int. Cl.
*H02K 5/173* (2006.01)
*H02K 9/19* (2006.01)

(56) References Cited

U.S. PATENT DOCUMENTS

| | | |
|---|---|---|
| 2005/0093385 A1 | 5/2005 | Kuhn |
| 2012/0107102 A1 | 5/2012 | Korenblik |
| 2012/0107105 A1 | 5/2012 | Korenblik |
| 2015/0276282 A1* | 10/2015 | Heiden ............... F04D 29/5806 62/505 |

* cited by examiner

MAGNETIC BEARING COOLING MANAGEMENT

CROSS REFERENCE TO A RELATED APPLICATION

The application claims the benefit of U.S. Provisional Application No. 62/967,620 filed Jan. 30, 2020, the contents of which are hereby incorporated in their entirety.

BACKGROUND

Hermetically cooled motors, for example, the magnetically driven motors of centrifugal compressors may use refrigerant to provide cooling. This refrigerant may be introduced inside the compressor in either a liquid phase or a vapor phase. Since refrigerant in a liquid phase has the ability to absorb more heat relative to refrigerant in a vapor phase, in certain instances, it is advantageous to inject refrigerant in a liquid phase into the compressor.

Refrigerant can be used by magnetically driven compressors to provide cooling for the electric motor (e.g. the rotors) and the magnetic bearings. The bearings of the compressor are typically used to support the rotating shaft of the compressor. The rotors are typically mounted to the rotating shaft. To cool these components refrigerant may be injected into the compressor (e.g. in liquid phase). The injection of the refrigerant is commonly completed using a fixed orifice that injects the refrigerant at a high enough rate to provide adequate cooling when the compressor is running at maximum load.

Due to the relative placement of the electric motor and the magnetic bearings, refrigerant used to cool the electric motor may migrate toward the magnetic bearings causing the magnetic bearings to overcool. This may be especially prevalent when the compressor is operating at low load, which can result in more refrigerant pooling due to less heat being generated by the motor. When overcooled the magnetic bearings may shrink. This can pose an issue with the sensors mounted to the magnetic bearings. These sensors are typically used to measure relative distances between the bearings and the adjacent components (e.g. the rotating shaft). When overcooled the sensors may malfunction (e.g. tripping the bearing controls) as a result of the reading showing the relative distance measured greater than an acceptable range.

Accordingly, there remains a need for a way to manage the cooling within a compressor to prevent, or at least mitigate, the overcooling of the magnetic bearings.

BRIEF DESCRIPTION

According to one embodiment, a shield for controlling the cooling within a hermetically cooled motor is provided. The shield includes an insulator surface, at least one fastener aperture, and at least one venting aperture. The insulator surface includes a first side and a second side. The insulator surface is configured to restrict the flow of a working fluid. The at least one fastener aperture is disposed in the insulator surface. The at least one venting aperture is disposed in the insulator surface. The at least one venting aperture is configured to control a pressure differential between the first side and the second side.

In accordance with additional or alternative embodiments, the shield includes an annulus shape having an outer diameter and an inner diameter. The at least one fastener aperture may be disposed circumferentially adjacent to the outer diameter, and the at least one venting aperture may be disposed circumferentially adjacent to the inner diameter.

In accordance with additional or alternative embodiments, the insulator surface is made of a material with low electrical and thermal conductivity.

In accordance with additional or alternative embodiments, the material is Garolite.

According to another aspect of the disclosure, a compressor including an electric motor, a magnetic bearing, and a shield disposed adjacent to the electric motor is provided. The electric motor is used for driving a rotating shaft. The magnetic bearing is disposed adjacent to the electric motor. The shield includes an insulator surface configured to restrict the flow of a working fluid, at least one fastener aperture disposed in the insulator surface, and at least one venting aperture disposed in the insulator surface. The at least one venting aperture is configured to control a pressure differential between the first side and the second side.

In accordance with additional or alternative embodiments, the shield includes an annulus shape having an outer diameter and an inner diameter. The at least one fastener aperture may be disposed circumferentially adjacent to the outer diameter. The at least one venting aperture may be disposed circumferentially adjacent to the inner diameter.

In accordance with additional or alternative embodiments, the shaft passes through the annulus.

In accordance with additional or alternative embodiments, the compressor further includes a fastening assembly, the fastening assembly configured to secure the shield to the magnetic bearing through at least one of the fastener apertures.

In accordance with additional or alternative embodiments, the fastening assembly includes at least one of a fastener, a washer, and a sleeve.

In accordance with additional or alternative embodiments, the compressor further includes at least one first jet disposed upstream of the shield, and at least one second jet disposed downstream of the shield. The at least one first jet and the at least one second jet may be configured to distribute the working fluid.

In accordance with additional or alternative embodiments, the distributed working fluid is configured to pass through the at least one venting aperture.

In accordance with additional or alternative embodiments, the at least one first jet is configured to distribute the working fluid to the electric motor.

In accordance with additional or alternative embodiments, the at least one second jet is configured to distribute the working fluid to the magnetic bearing.

In accordance with additional or alternative embodiments, the working fluid is in a substantially liquid phase.

In accordance with additional or alternative embodiments, the working fluid is R-134A refrigerant.

In accordance with additional or alternative embodiments, the compressor is a centrifugal compressor.

In accordance with additional or alternative embodiments, the compressor is an axial compressor.

In accordance with additional or alternative embodiments, the compressor is a scroll compressor.

BRIEF DESCRIPTION OF THE DRAWINGS

The subject matter, which is regarded as the disclosure, is particularly pointed out and distinctly claimed in the claims at the conclusion of the specification. The following descrip

DETAILED DESCRIPTION

As will be described below, a shield for controlling the cooling within a hermetically cooled motor, and a compressor incorporating the same are provided. The shield makes it possible to prevent, or at least mitigate, the overcooling of the magnetic bearings within a compressor. In certain instances, the shield acts as a protective boundary by restricting the flow of refrigerant from an electric motor of a compressor toward a magnetic bearing of a compressor. By restricting the flow of refrigerant with a shield, cooling of the magnetic bearings within a compressor can be managed without requiring an active control (e.g. actively adjusting the amount of refrigerant being dispersed by one or more jet).

Figure 1:
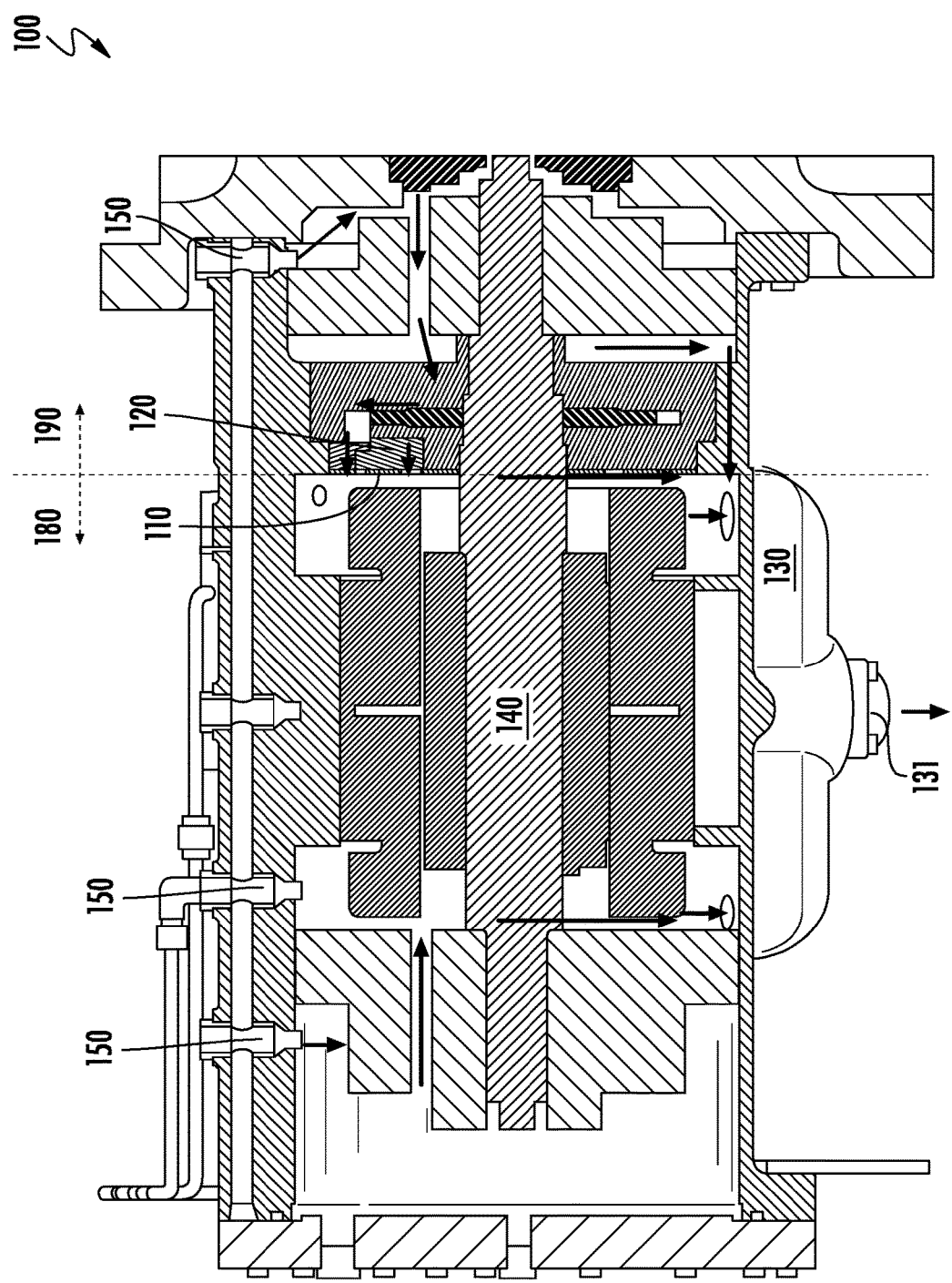
- FIG. 1 is a cross-sectional side view of a compressor illustrating the flow of a working fluid for the cooling of a magnetic bearing in accordance with one aspect of the disclosure.
Figure 2:
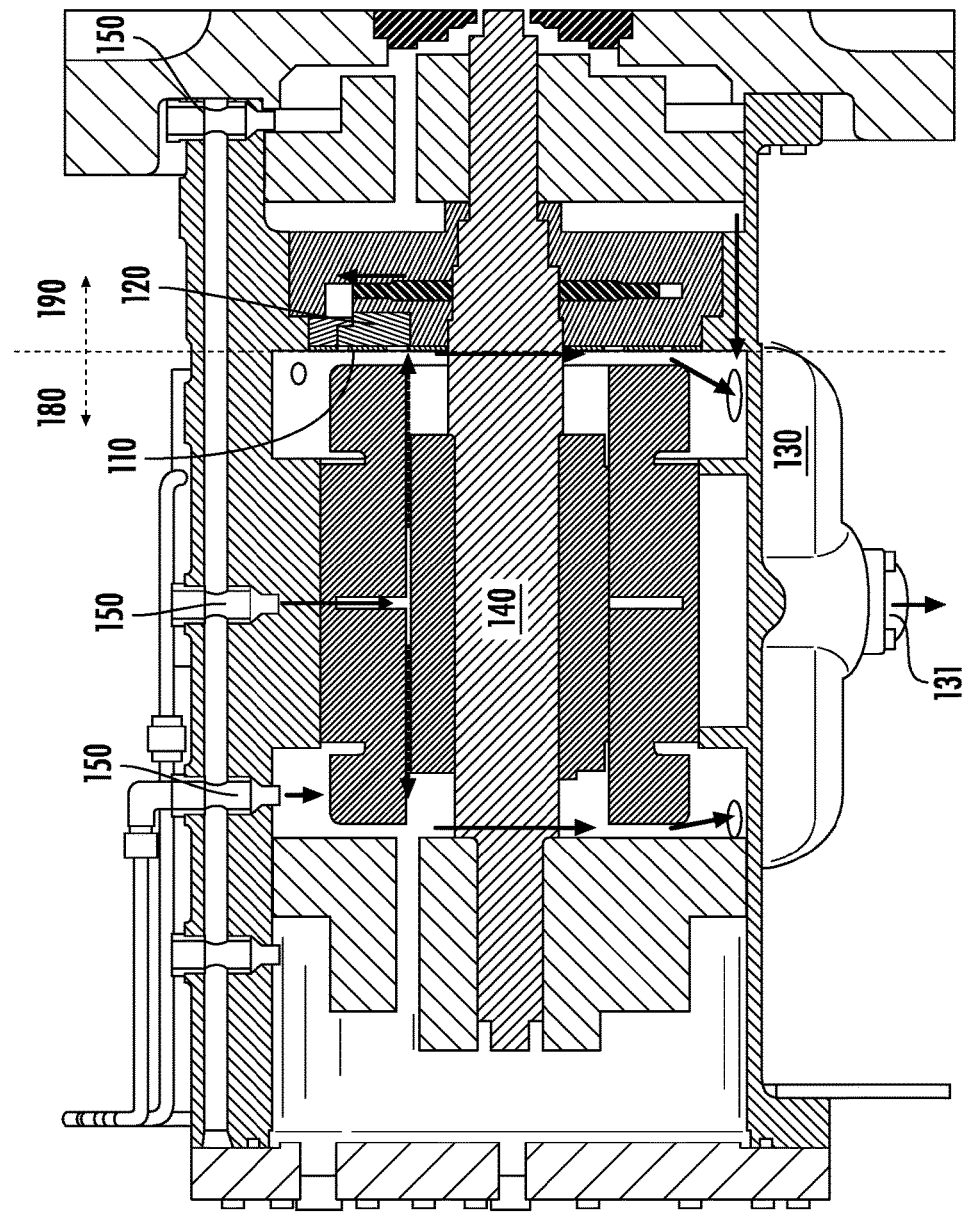
FIG. 2 is a cross-sectional side view of a compressor illustrating the flow of a working fluid for the cooling of an electric motor in accordance with one aspect of the disclosure.

Although it is envisioned that the shield 110 could be used in any hermetically cooled motor, for purposes of simplicity and brevity, the shield 110 is described in terms of being used in a compressor 100. For example, a compressor 100 with an electric motor 130 and a magnetic bearing 120. An exemplary depiction of a shield 110 within a compressor 100 with an electric motor 130 and a magnetic bearing 120 is shown in FIGS. 1 and 2. The electric motor 130 is used by the compressor 100 for driving a rotating shaft 140. The magnetic bearing 120 is used by the compressor 100 for magnetically levitating the rotating shaft 140. To control the cooling within the within the compressor 100 (e.g. to prevent the overcooling of the magnetic bearing), a shield 110 is configured between the electric motor 130 and the magnetic bearing 120.

The shield 110 includes an insulator 111, at least one fastener aperture 112, and a venting aperture 113. The shield 110 is configured such that one side (e.g. the first side 180) is adjacent to the electric motor 130, and the other side (e.g. the second side 190) is adjacent to the magnetic bearing 120. The shield 110 is configured to restrict the flow of a working fluid (e.g. refrigerant) between the electric motor 130 and the magnetic bearing 120. By restricting the flow of the working fluid, the shield 110, in certain instance, helps to prevent, or at least mitigate, overcooling of the magnetic bearing 120 within the compressor 100.

To facilitate the distribution of the working fluid (e.g. refrigerant) through the compressor 100, the compressor 100 may include at least one jet 150. The jet 150 may be any orifice capable injecting an effective amount of working fluid into the compressor 100 to prevent overheating. In certain instances, the compressor 100 includes at least one jet 150 upstream of the shield 110 and at least one jet 150 downstream of the shield 110. The jet(s) 150 upstream of the shield 110 may be used to distribute the working fluid to cool the electric motor 130. The jet(s) 150 downstream of the shield 110 may be used to distribute the working fluid to cool the magnetic bearing 120. The shield 110, by being configured between the electric motor 130 and the magnetic bearing 120, restricts the flow of the working fluid between the electric motor 130 and magnetic bearing 120. By restricting the flow of working fluid through the shield 110, in certain instances, helps to prevent, or at least mitigate, overcooling of the magnetic bearing 120.

In certain instances, the working fluid injected into the first side 180 and the second side 190 of the shield is in a substantially liquid phase. A substantially liquid phase can be interpreted to mean that more of the working fluid is in liquid phase than vapor phase. In some embodiments, the shield 110 allows for the working fluid to flow from the second side 190 of the shield 110 to the first side of the shield 180 so that the working fluid can pass to the drain 131 in the electric motor 130. In certain instances, the working fluid is R-134A refrigerant. In some embodiments, the compressor is either a centrifugal compressor, an axial compressor, or a scroll compressor.

Figure 3:
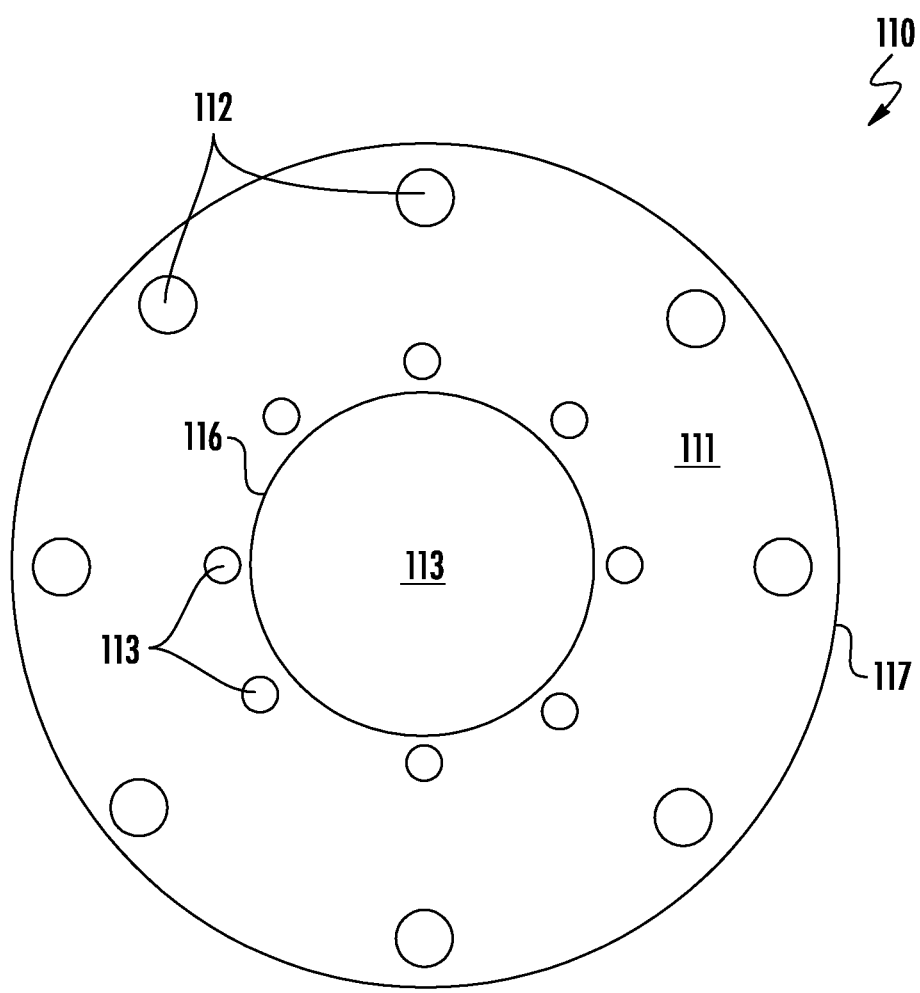
FIG. 3 is a perspective view of a shield in accordance with one aspect of the disclosure.

A perspective view of the shield 110 in accordance with one aspect of the invention is shown in FIG. 3. The shield 110 includes an insulator 111 for restricting the flow of a working fluid (e.g. refrigerant) between a first side 180 and a second side 190 (shown in FIGS. 1 and 2). The shield 110 also includes at least one fastener aperture 112 disposed in the insulator 111 to enable the insulator 111 to be secured to the magnetic bearing 120 and/or the bearing housing 121. To secure the insulator 111, at least one fastener, for example, one or more shoulder bolt (shown in FIGS. 4 and 5), can be inserted through the at least one fastener aperture 112. The shield 110 additionally includes at least one venting aperture 113 for controlling a pressure differential between the first side 180 and the second side 190.

The venting aperture 113, in certain instances, is provided through use of at least one hole through the insulator 111. At least one hole may be used to allow the passage of a rotating shaft 140 (shown in FIGS. 1 and 2). When incorporating a hole for the rotating shaft 140, the hole for the rotating shaft 140 may be the venting aperture 113 (e.g. enabling the control of the pressure differential between the first side and the second side). For example, the hole used to allow the passage of the rotating shaft 140 may be wide enough in diameter to create a gap between the insulator 111 and the rotating shaft 140. This gap, in certain instances, helps to control the pressure differential between the first side 180 and the second side 190.

It is envisioned that the venting aperture 113 may be provided through use of any number of holes, spaced in any manner, and configured in any shape (e.g. circular, square, etc.) such that both the working fluid flow and pressure differential can be effectively controlled between each side 180, 190 of the shield 110. Effective control of working fluid flow can be viewed as allowing for the working fluid to pass to the magnetic bearings 120 in such a manner that overheating and overcooling are prevented. Effective control of pressure differential can be viewed as preventing a substantial difference in pressure between each side 180, 190 of the shield 110. A substantial difference in pressure is one that could adversely affect the structure of the shield.

In certain instances, the insulator 111 is made of a material with low electrical and thermal conductivity. For example, the insulator 111 may be made of, at least in part, G10-FR4 (commonly known as "Garolite"). However, it is envisioned that the insulator 111 may be made of any material capable of restricting the flow of the working fluid. For example, the insulator 111 may be made of, at least in part, a variety of different plastic materials and/or polymers with low electrical and thermal conductivity.

Figure 4:
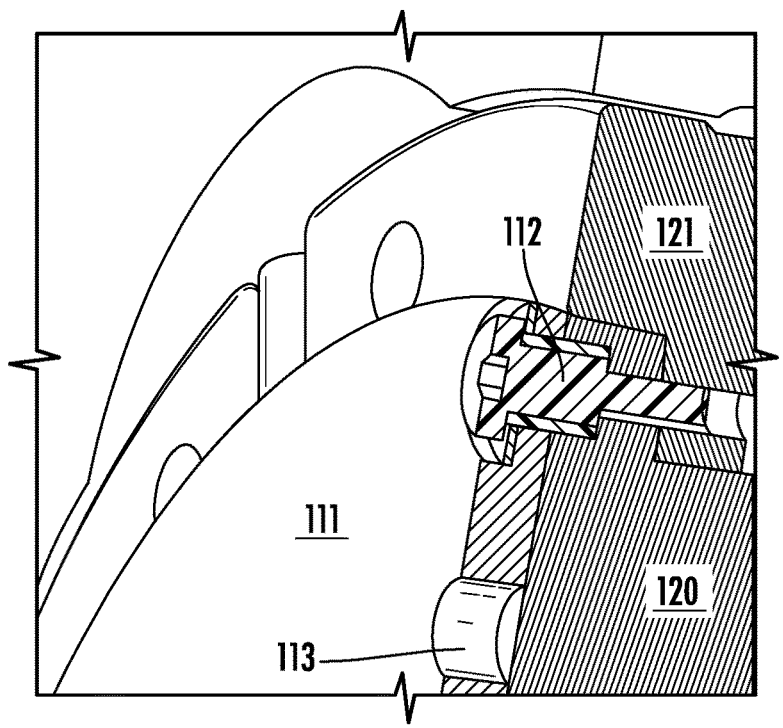
FIG. 4 is an assembled cross-sectional side view of the shield shown in FIG. 3 within the compressor shown in FIGS. 1 and 2 in accordance with one aspect of the disclosure.
Figure 5:
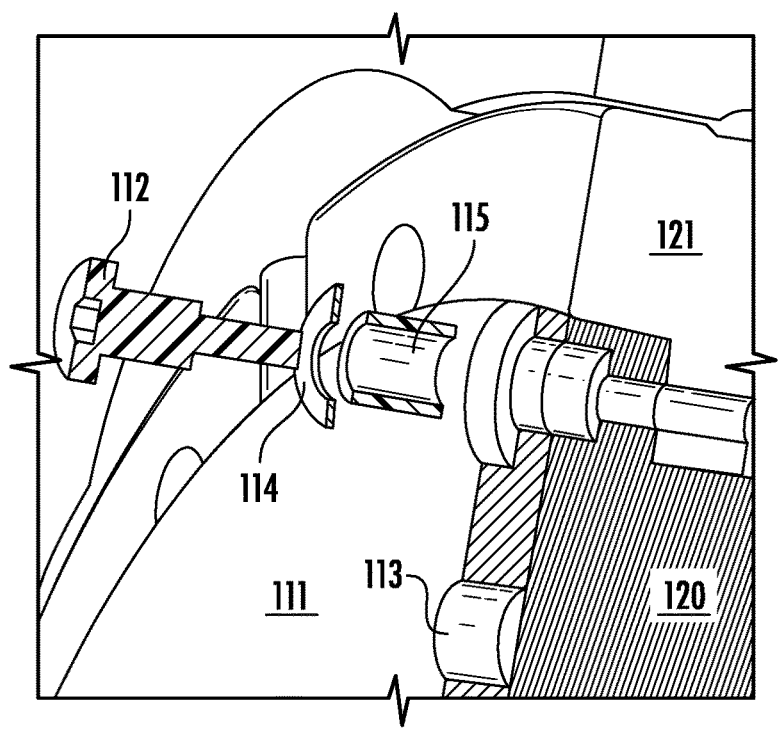
FIG. 5 is an exploded cross-sectional side view of the shield shown in FIG. 3 within the compressor shown in FIGS. 1 and 2 in accordance with one aspect of the disclosure.

To allow for the shield 110 to expand and contract, which is caused by the thermal effects of the working fluid, in certain instances, each respective fastener 112 may use a spring washer 114. The use of a fastener 112 with a spring washer 114 is shown in FIGS. 4 and 5. The spring washer 114 may be any type of spring washer 114, for example, a Belleville spring washer, a curved spring washer, a finger spring washer, or a wave spring washer. Regardless of the type of spring washer 114 utilized, in certain instances, the spring washer 114 is used to allow the shield 110 to expand and contract without generating, or at least minimizing, stress near the fastener 112.

As shown in FIGS. 4 and 5, in certain instances the shield 110 is secured by passing a fastener 112 into the magnetic bearing 120 and/or the bearing housing 121. To transmit the clamping force from the fastener 112 (e.g. from the head of the shoulder bolt) to the housing 121, in certain instances, a sleeve 115 may be used. The sleeve 115, in certain instances, is a tube of sufficient length and diameter to allow the passage of the fastener 112. This sleeve 115, in certain instances, helps reduce the stress on the insulator 111 caused by the fastener 112 (e.g. if the clamping force of the fastener 112 is directly applied to the insulator 111 the stress on the insulator 111 may be comparatively higher relative to the stress on the insulator 111 when a sleeve 115 is used).

As shown in FIG. 3, in certain instances, the shield 110 is configured in an annulus shape having an outer diameter 117 and an inner diameter 116. At least one fastener aperture 112, in certain instances, is disposed circumferentially adjacent to the outer diameter 117. At least one venting aperture 113, in certain instances, is disposed circumferentially adjacent to the inner diameter 116. As described above, the design and configuration of the components of the shield 110, and the positioning within a hermetically cooled motor (e.g. a compressor 100) enable a relatively simplistic technique for preventing, or at least mitigating, overcooling of a magnetic bearing 120.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A shield for controlling cooling within a hermetically cooled motor, the shield comprising: an insulator surface comprising a first side and a second side, the insulator surface configured to restrict the flow of a working fluid; at least one fastener aperture disposed in the insulator surface; and at least one venting aperture disposed in the insulator surface, the at least one venting aperture configured to control a pressure differential between the first side and the second side.

2. The shield of claim 1, wherein the shield comprises an annulus shape having an outer diameter and an inner diameter; and wherein the at least one fastener aperture is disposed circumferentially adjacent to the outer diameter, and the at least one venting aperture is disposed circumferentially adjacent to the inner diameter.

3. The shield of claim 1, wherein the insulator surface is comprised of a material with low electrical and thermal conductivity.

4. The shield of claim 3, wherein the material is Garolite.

5. A compressor comprising:
an electric motor for driving a rotating shaft;
a magnetic bearing disposed adjacent to the electric motor,
a shield disposed between the electric motor and the magnetic bearing, the shield comprising:
an insulator surface configured to restrict the flow of a working fluid;
at least one fastener aperture disposed in the insulator surface; and
at least one venting aperture disposed in the insulator surface, the at least one venting aperture configured to control a pressure differential between the first side and the second side.

6. The compressor of claim 5, wherein the shield comprises an annulus shape having an outer diameter and an inner diameter; and wherein the at least one fastener aperture is disposed circumferentially adjacent to the outer diameter, and the at least one venting aperture is disposed circumferentially adjacent to the inner diameter.

7. The compressor of claim 6, wherein the shaft passes through the annulus.

8. The compressor of claim 6, further comprising a fastening assembly, the fastening assembly configured to secure the shield to the magnetic bearing through at least one of the fastener apertures.

9. The compressor of claim 8, wherein the fastening assembly comprises at least one of a fastener, a washer, and a sleeve.

10. The compressor of claim 5, further comprising at least one first jet disposed upstream of the shield, and at least one second jet disposed downstream of the shield; the at least one first jet and the at least one second jet are configured to distribute the working fluid.

11. The compressor of claim 10, wherein the distributed working fluid is configured to pass through the at least one venting aperture.

12. The compressor of claim 10, wherein the at least one first jet is configured to distribute the working fluid to the electric motor.

13. The compressor of claim 10, wherein the at least one second jet is configured to distribute the working fluid to the magnetic bearing.

14. The compressor of claim 10, wherein the working fluid is in a substantially liquid phase.

15. The compressor of claim 10, wherein the working fluid is R-134A refrigerant.

16. The compressor of claim 5, wherein the compressor is a centrifugal compressor.

17. The compressor of claim 5, wherein the compressor is an axial compressor.

18. The compressor of claim 5, wherein the compressor is a scroll compressor.

\* \* \* \* \*